United States Patent [19]

Izuma et al.

[11] 4,010,965
[45] Mar. 8, 1977

[54] PIPE JOINT FOR CONNECTING DIFFERENT KINDS OF METALLIC PIPES

[75] Inventors: Takeshi Izuma; Chiyoshi Fukumoto; Kazuhiko Yamaura, all of Takashimagun, Japan

[73] Assignee: Asahi Kasei Kogyo Kabushiki Kaisha, Osaka, Japan

[22] Filed: Apr. 8, 1975

[21] Appl. No.: 566,534

[30] Foreign Application Priority Data

Apr. 15, 1974 Japan .............................. 49-40941

[52] U.S. Cl. ................................ 285/173; 29/197; 228/107; 285/DIG. 5
[51] Int. Cl.² ........................................ F16L 55/00
[58] Field of Search ............. 29/196.6, 197, 197.5, 29/198; 228/107, 108, 109, 208; 285/173, 329, DIG. 5

[56] References Cited

UNITED STATES PATENTS

| 3,137,937 | 6/1964 | Cowon et al. .................. 29/109 X |
| 3,473,216 | 10/1969 | Nord et al. ..................... 29/197 X |
| 3,583,064 | 6/1971 | Costello et al. ............... 285/173 X |
| 3,689,232 | 9/1972 | Baba et al. ..................... 29/197 X |
| 3,798,011 | 3/1974 | Shurp ................................. 29/197 |

*Primary Examiner*—Dave W. Arola
*Attorney, Agent, or Firm*—Armstrong, Nikaido & Wegner

[57] ABSTRACT

A pipe joint for connecting an aluminum pipe to a stainless steel pipe, where the joint consists of washer layers of aluminum, titanium, nickel and stainless steel in this order, each being tightly bonded and integrated in the axial direction of the pipe joint into one assembly by explosion bonding.

2 Claims, 1 Drawing Figure

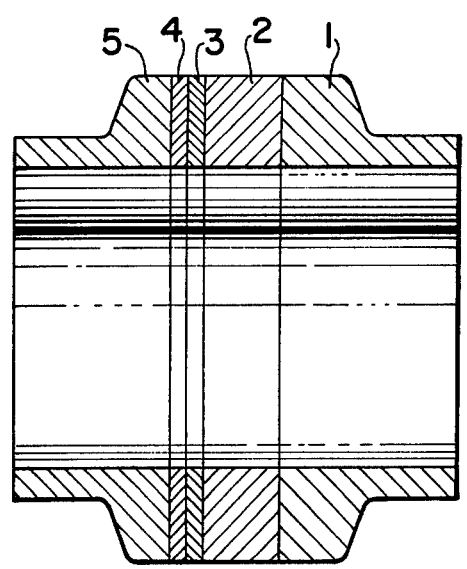

PIPE JOINT FOR CONNECTING DIFFERENT KINDS OF METALLIC PIPES

This invention relates to a pipe joint for connecting different kinds of metallic pipes, and particularly to an intermediate pipe joint for connecting different kinds of metallic pipes to each other in an apparatus for transporting or storing a fluid at an extremely low temperature or other similar apparatuses.

Heretofore, clad plates or clad pipes made by explosive bonding have been widely used in chemical reaction vessels, heat exchangers, etc. Their superiority as joint materials for connecting different kinds of metals has been recently recognized, and the clad plates or clad pipes are used in various fields. For example, they are used as:

1. aluminum-steel joint for connecting a spherical aluminum storage tank to a steel structure,
2. aluminum-steel joint for connecting a steel ship body to an aluminum deck or aluminum structure,
3. aluminum-steel joint for connecting a steel frame of vehicle to an aluminum body,
4. aluminum-steel tubular joint for connecting a steel pipe to an aluminum pipe in a circuit for transferring low temperature liquid in a refrigerator ship, refrigerator vehicle or other refrigerator apparatuses,
5. copper-aluminum bus bar for connecting a copper terminal of transformer or other various transmission or receiving substations to an aluminum bus bar,
6. conductive terminals of copper-aluminum bus bar,
7. electric contacts of copper-silver, copper-aluminum, platinum-copper, etc. in electronic circuits of various electrical apparatuses,
8. aluminum-steel joint for connecting a steel electrode of mercury process electrolytic cell to an aluminum bus bar,
9. titanium-copper tubular or bar joint for connecting a titanium electrode of diaphragm process electrolytic cell to a copper bus bar,
10. copper-aluminum tubular sleeve joint for connecting a copper electric wire to an aluminum wire, and
11. copper-aluminum tubular joint in various low temperature liquid circuits for refrigerator, refrigerator apparatuses, air-conditioning apparatuses, etc.

Some of these joints can well satisfy their respective requirements, but some needs further improvement. For example, demands for special joints have been more and more increased in the fields of low temperature industry such as the liquefied natural gas industry or liquefied nitrogen gas industry, and their service conditions have been also more severe. Therefore, there are needs for improvements of the conventional joints, which are prepared in a flange procedure, screwing procedure, casting procedure, brazing procedure, sintering procedure, hot rolling procedure, cold pressure welding procedure, friction pressure welding procedure, etc., and are widely used as joints for connecting an aluminum pipe to a stainless steel pipe in a circuit for transferring a low temperature liquid, or even aluminum-titanium-stainless steel joints, which have greatly improved properties over those of the former joints and prepared by explosive bonding procedure of the prior invention made by the present applicant, Japanese Patent Publication No. 15,333/74 (U.S. Pat. No. 3,689,232). That is to say, the aluminum-titanium-stainless steel joint of said prior invention (Japanese Patent Publication No. 15,333/74) made by the present applicants has improvements in deteriorations of pressure welding strength and gas tightness by the heat of welding, and is most reliable as joints for apparatuses to be used in an operating temperature range from room temperature to −130° C, and has satisfactory properties for the requirements. However, said explosion-clad joint of aluminum-titanium-stainless steel has a considerable deterioration in impact-resistant characteristic at a temperature below −130° C, and this is a disadvantage of the joint.

As a result of further studies to solve said new problem, that is, to develop and provide a joint of improved impact-resistant characteristic at a temperature below −130° C, the present inventors have found that the problem of deterioration in the impact-resistant characteristic is in a combination of materials, that is, titanium-stainless steel.

Thus, the present inventors made a wide range of searches for the prior art of multi-layer clad plates, including the following references to find out whether they might offer information of value, but could not find any art teaching or suggesting a solution of the problem:

Japanese Patent Publication No. 17427/67 (U.S. Pat. No. 3,137,937; British Pat. No. 923,746),
Japanese Pat. Publication No. 20101/68 (U.S. Pat. application No. 387,715)
British Pat. No. 1,215,384
British Pat. No. 1,168,264
British Pat. No. 1,078,556
British Pat. No. 1,042,952 (patent of addition to said British Pat. No. 923746)
British Pat. No. 1,017,059 (Japanese Pat. Publication No. 21206/63)
Swiss Pat. No. 441,951 (U.S. Pat. No. 3,305,922)

For example, said Japanese Pat. Publication No. 17427/67 (U.S. Pat. No. 3,137,937; British Pat. No. 923,746) discloses a multi-layer clad plate of various materials, but merely enumerates combinations of weldable materials, and nowhere suggests restrictions to conditions or orientation for improving the pressure weldability, heat resistance, impact-resistant characteristics and gas tightness, or nowhere discloses pressure welding characteristics of multi-layer metals where titanium is interposed as an intermediate metal layer. Thus, the prior art is not useful for solving the problem.

Another reference, British Pat. No. 1,078,556 discloses an art of explosive bonding of a metal of iron system to a surface of aluminum piece by melt-spraying a third metal such as molybdenum, titanium, cobalt or nickel to the surface of the aluminum in advance, but nowhere makes mention of the impact resistant characteristic or gas tightness at the low temperature, either. Since the prior art is directed to the multi-layer clad process based on the melt-spraying procedure, it is not useful for solving the problem.

Furthermore, another reference, U.S. Pat. No. 3,305,922 enumerates various metals as an intermediate metal layer for laminated clad plates, but nowhere teaches or suggests at all what intermediate layer should be selected for clad plates to be used as joint materials for aluminum and stainless steel with respect to the gas tightness and mechanical strength, or what conditions and orientation are required for the selection of the intermediate layer.

Thus, any useful information has not been obtained from these prior arts.

Consequently, the present inventors have proceeded with their own studies to solve the problem of deterioration in the impact-resistant characteristic of titanium-stainless steel, and as a result of researches of joints of aluminum-copper-stainless steel, aluminum-tatalum-stainless steel, and aluminum-zirconium-stainless steel, using copper, tantalum, and zirconium in place of titanium, the present inventors have found that the impact-resistant characteristic and the mechanical strength of these joints at the low temperature are not improved, as in the case where titanium is used as the intermediate layer.

Then, the present inventors have made tests on various materials to find out whether or not there is an intermediate layer having a good pressure weldability with both aluminum nd stainless steel, and satisfactory gas tightness, impact-resistant characteristic and mechanical strength at the low temperature, but have failed to obtain any satisfactory result.

Thus, the present inventors have tried to provide one more intermediate layer between titanium and stainless steel as a second method for improving the inconvenient combination of titanium with stainless steel, and as a result of various tests on the materials of the second intermediate layer, the present inventors have found that nickel or soft nickel alloy is most suitable.

That is to say, the present invention provides a pipe joint for connecting an aluminum pipe to a stainless steel pipe, characterized by washer layers of aluminum, titanium, nickel and stainless steel in this order, each being bonded in the axial direction of pipe joint to one another by explosive bonding.

Usually, corrosion-resistant aluminum is used in the low temperature industry, for example, in the fields of low temperature liquid transfer pipes, liquefaction apparatuses, storage tanks, etc. for liquid oxygen, liquid nitrogen, liquid helium, liquefied natural gas, etc. as aluminum materials, and thus the corrosion-resistant aluminum material is used as the aluminum washer layer for the present pipe joint. However, the corrosion-resistant aluminum is the metal whose explosive bonding with other metals than aluminum is regarded as difficult. Thus, the present pipe joint is actually a clad joint of 5 washer layers consisting of corrosion-resistant aluminum, pure aluminum, titanium, nickel and stainless steel, and austenite stainless steel free from low temperature brittleness is used as the stainless steel washer layer for the pipe joint.

The present clad pipe joint of 5 washer layers has a good gas tightness, and a good impact-resistance even at $-198°$ C as well as a satisfactory mechanical strength. As compared with the conventional clad pipe joint of three washer layers of aluminum, titanium and stainless steel, whose properties are considerably deteriorated at a temperature below $-130°$ C, it is seen that the present pipe joint has a great improvement.

It is not clear yet why a distinguishedly strong bondage with a good impact-resistant characteristic at the low temperature can be obtained without any deterioration in the bonding strength even under a substantial heat influence due to welding, etc. when a nickel layer is interposed between titanium and stainless steel, but, in addition to the fact that nickel itself is a low temperature material, nickel is distinguished in bonding ability with other metals, as used in a roll clad process such as hot rolling, cold rolling, etc. as a bonding medium. Its pressure weldability with titanium and stainless steel is distinguished also in the explosive bonding process, and any formation of brittle and weak deteriorated alloy is not observed at their respective boundary surfaces of bonding. Therefore, there is no growth of said alloy even under the heat influence, and it seems that any phenomenon of lowering in the bonding strength does not appear. In the bonding of titanium and stainless steel, there is a considerable difference in coefficients of thermal expansion between titanium and stainless steel, and therefore a shearing force is developed at their boundary surface of the bonding due to the difference in inside stress between titanium and stainless steel, when they are subject to heat influence, for example, due to the heat of welding or low temperature. Consequently, deterioration of the properties is accelerated. In the present invention, on the other hand, nickel is sandwiched between titanium and stainless steel, and thus the inside stress of their respective washer layers is considerably buffered.

In view of an advantage of bondage in complicated corrugated form of mutual tight engagement at the boundary surface over the simple plane bondage when a tensile stress, shearing stress, impact stress, etc. act on the boundary surface of the bonding, it can be said that the bonding state of the washer layers of the present pipe joint has a corrugated form enough to ensure its zipper effect.

As described above, the trouble occurring between titanium and stainless steel in the conventional pipe joint of aluminum, titanium and stainless steel is overcome by sandwiching nickel between titanium and stainless steel, and the pressure weldability, metallurgical bonding state, difference in thermal expansion and corrugated form of the boundary surface are all improved in the present invention. Thus, in the present invention, a pipe joint having a good impact resistance and mechanical strength at the low temperature can be provided.

Now, the present invention will be described in detail below, referring to the accompanying drawing.

Single FIGURE is a cross-sectional view of a pipe joint of the present invention for connecting an aluminum pipe to a stainless steel pipe, where numeral 1 is a corrosion-resistant aluminum washer layer, 2 a pure aluminum washer layer, 3 a titanium washer layer, 4 a nickel washer layer, and 5 a stainless steel washer layer, and each washer layer is tightly bonded to each other by explosive bonding.

To prepare a pipe joint of 4 or 5 washer layers of the present invention, a clad plate is made according to the well known explosive bonding procedure, and an annular piece of any desired dimension in a flange shape, which suits a pipe to be connected to, is cut out of the clad plate, and used as the pipe joint. For example, in the case of a clad pipe joint of 5 washer layers consisting of corrosion-resistant aluminum, pure aluminum, titanium, nickel and stainless steel, the strength of pure aluminum is lowest, and is about one-third time that of corrosion-resistant aluminum. Thus, the flange part of said clad pipe joint of 5 washer layers for connecting the corrosion-resistant aluminum pipe to the stainless steel pipe must have a wall thickness of at least three times that of the corrosion-resistant aluminum pipe, thereby providing a pipe joint having a satisfactory mechanical strength, as shown in FIGURE.

As another means for supplementing the mechanical strength of the pipe joint, openings are provided through the flange part in the axial direction of the pipe joint, and the flange part is fastened tightly with a number of bolts.

The corrosion-resistant aluminum washer layer and the stainless steel washer layer of the clad pipe joint of 5 washer layers as shown in the FIGURE are subjected to explosive bonding so as to have wall thicknesses enough to form a flange part as shown in the FIGURE, but the respective 5 washer layers must have a wall thickness enough to allow the pressure welded parts of the washer layers to withstand any deterioration in strength due to the heat influence of welding the pipe joint to the corrosion-resistant aluminum pipe and stainless steel pipe.

Of course, the heat influence of welding depends upon the welding procedure and proficiency of the welding worker, but it is preferable to carry out the welding in a short time at a temperature below 430° C.

Preferable thicknesses of the corrosion-resistant aluminum washer layer and stainless steel washer layer are each at least 20 mm in this case.

The pipe joint of 5 washer layers is not restricted to the shape shown in the FIGURE, but the pipe joints of doughnut shape prepared by simply cutting an explosion-bonded plate of five layers into a ring piece, or pipe joints with a single flange only on one side, etc. can be used. Thus, the present pipe joints are not restricted to specific shapes. However, when some deterioration in the strength of the boundary surface of the joint is foreseen due to insufficient control of welding temperature at the job site where the pipe joints are welded, a corrosion-resistant aluminum auxiliary pipe and a stainless steel auxiliary pipe are welded to the corrosion-resistant aluminum washer layer and the stainless steel washer layer, respectively, in advance, in a factory ensuring a sufficient control of the welding temperature, and then an aluminum pipe of same kind and a stainless steel pipe are connected to said aluminum auxiliary pipe and stainless steel auxiliary pipe of the pipe joint at the job site by welding. Thus, any stringent precaution for the control of the welding temperature is not necessitated in that procedure.

As a method for preparing a multi-layer clad plate, there are available, for example, a method for subjecting the individual layers to successive explosive bonding, thereby forming a multi-layer clad plate, a method for subjecting the individual layers to one explosive bonding, thereby forming a multi-layer clad plate through one explosion, a method for subjecting the individual layers to two or more explosive bondings, thereby forming a clad plate of two or more layers, and subjecting the resulting clad plate to further explosive bonding with another clad plate, thereby forming a multi-layer clad plate as an ultimate product. Any clad plate prepared according to any of these methods can be used for preparing the present pipe joint.

EXAMPLE

A stainless steel plate as a matrix plate and a nickel plate as a layer plate as shown in Table 1 were so arranged as to provide a clearance between the stainless steel plate and the nickel plate, as shown in Table 2. A powdery explosive consisting of 10% penthrit, 3% starch and 87% ammonium nitrate was placed upon the entire surface of the layer plate in the amount as shown in Table 2, and subjected to initiation and explosion from the center of the explosive by means of an electric detonator to effect explosive bonding, and clad plate of stainless steel and nickel was prepared.

Table 1

| Material | Symbol | Thickness | Dimension |
| --- | --- | --- | --- |
| Stainless steel | SUS304 | 30 mm | 500×500 mm |
| Nickel | Ni | 15 mm | 530×530 mm |
| Titanium | Ti | 20 mm | 530×530 mm |
| Pure aluminum | A1050 | 12 mm | 530×530 mm |
| Corrosion-resistant aluminum | A5083 | 40 mm | 530×530 mm |

Table 2

| Order of explosive bonding | Clearance | Amount of explosive |
| --- | --- | --- |
| SUS304 + Ni | 3 mm | 14 kg/m$^2$ |
| (SUS304 + Ni) + Ti | 4 mm | 21 kg/m$^2$ |
| (SUS304 + Ni + Ti) + A1050 | 6 mm | 21 kg/m$^2$ |
| (SUS304 + Ni + Ti + A1050) + A5083 | 4 mm | 40 kg/m$^2$ |

Then, the resulting clad plate of stainless steel and nickel as a matrix plate, and a titanium plate as a layer plate as shown in Table 1, were subjected to explosive bonding at the clearance and in the amount of explosive as shown in Table 2 in the same manner as above.

Then, the resulting clad plate of three layers as a matrix plate and a pure aluminum plate as a fourth layer plate were subjected to explosive bonding in the same manner as above, and finally, the resulting clad plate of four layers of stainless steel, nickel, titanium and aluminum as a matrix plate and a corrosion-resistant aluminum plate as a fifth layer plate were subjected to explosive bonding in the same manner as above, thereby preparing the desired clad plate of five layers.

Then, an annular pipe joint having an outer diameter of 89 mm, an inner diameter of 78 mm, and a thickness of 85.5 mm was cut out of the resulting clad plate of five layers.

Then, a stainless steel pipe having an outer diameter of 89 mm, an inner diameter of 78 mm and a length of 300 mm, and an aluminum pipe having an outer diameter of 89 mm, an inner diameter of 78 mm and a length of 300 mm were butt-welded to the stainless steel washer layer, and the corrosion-resistant aluminum washer layer of the pipe joint, respectively.

The boundary surface of bonding of the pipe joint reached a temperature of about 450° C in said butt-welding, but the washer layers were not peeled off on the boundary surfaces of the explosive bonding, and were in a satisfactory state of welding.

Then, the open ends of the aluminum pipe and stainless steel pipe butt-welded to both ends of the pipe joint were completely sealed by welding the open ends to the metals of the same kinds, respectively. A small opening was then provided to the stainless steel plate, and a leakage from the boundary surfaces of explosive bonding of the respective layers was detected by means of a helium leak tester. It was found that the pipe joint had a gas tightness of $10^{-7}$ atm cc/sec. or more.

Furthermore, a tensile load was applied to the pipe joint in the axial direction of the pipe joint, and the aluminum pipe was ruptured at a position near the butt-welded connection, but the boundary surfaces of explosive bonding of the respective washer layers of the pipe joint were in a satisfactory state.

To determine the characteristics of the pipe joint, the residue of the clad plate of five layers, from which the pipe joint was cut out, was heated at 450° C, and test pieces were prepared for impact test and microscopic observation. The microscopic observation of the test piece revealed that there took place a slight diffusion on the boundary surface of explosive bonding between the titanium washer layer and nickel washer layer, but no formation of deteriorated alloy layer was observed on the boundary surfaces of explosive bonding of the respective washer layers, and good corrugated boundary surfaces of explosive bonding were observed. Especially on the boundary surfaces among titanium, nickel and stainless steel washer layers, a complicated engagement of mutual inclusion of the respective metals into one another was observed. That is, a strong bondage was attained among these washer layers.

Results of impact tests are shown in Table 3, where the impact values of the conventional pipe joint of aluminum, titanium, and stainless steel are also given for comparison. From these results, it is seen that the present pipe joint especially has a distinguished impact-resistant characteristic at low temperatures.

The present pipe joint of aluminum, titanium, nickel and stainless steel is hardly deteriorated by heat influence of welding because of the strong bondage of the respective washer layer by explosive bonding, which also ensures a reliable gas tightness against the fluid leakage, and also has a distinguished impact-resistant characteristic at low temperatures. Thus, the present pipe joint is particularly suitable as a joint for connecting an aluminum pipe to a stainless steel pipe in the field of the low temperature industry.

What is claimed is:

1. A pipe joint for connecting an aluminum pipe to a stainless steel pipe, which comprises washer layers of aluminum, titanium, nickel and stainless steel in this order, each washer layer being welded to the adjacent layers in the axial direction of the pipe joint by explosive bonding.

2. A pipe joint according to claim 1, wherein the aluminum washer layer contains an additional corrosion-resistant aluminum washer layer as an outermost layer.

* * * * *

Table 3

| Test piece | Test temp. | Impact strength on each boundary surface of bonding (kg-m/cm$^2$) | | | | | | | |
|---|---|---|---|---|---|---|---|---|---|
| | | Al/Ti | | Ti/Ni | | Ni/SUS | | Ti/SUS | |
| Al/Ti/SUS joint | −130° C | 7.5 | 9.5 | — | — | — | — | 10.0 | 11.0 |
| | −198° C | 3.5 | 4.0 | — | — | — | — | 0.5 | 0.8 |
| Present joint | −130° C | 8.0 | 7.5 | 14.5 | 16.5 | 14.0 | 15.0 | — | — |
| | −198° C | 4.5 | 3.5 | 15.5 | 14.0 | 14.0 | 13.0 | — | — |